No. 619,130. Patented Feb. 7, 1899.
B. BRINK.
WING FOR KNEES ON HEAD BLOCKS FOR SAWMILLS.
(Application filed Aug. 20, 1895. Renewed Feb. 20, 1897.)
(No Model.) 2 Sheets—Sheet 1.
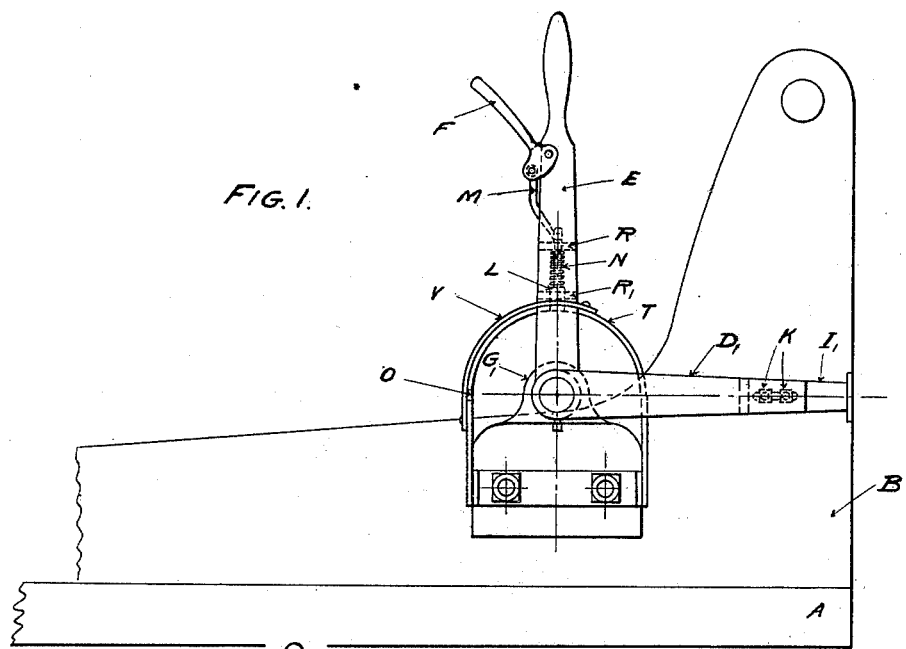
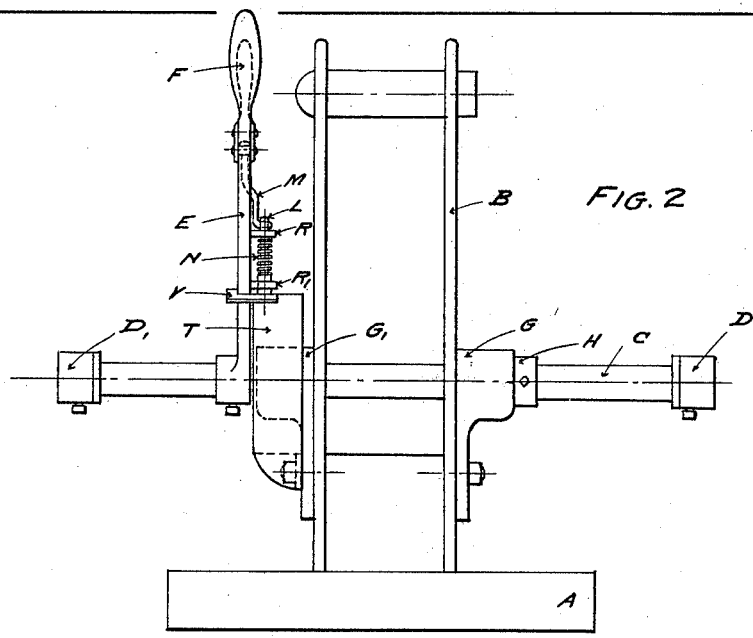

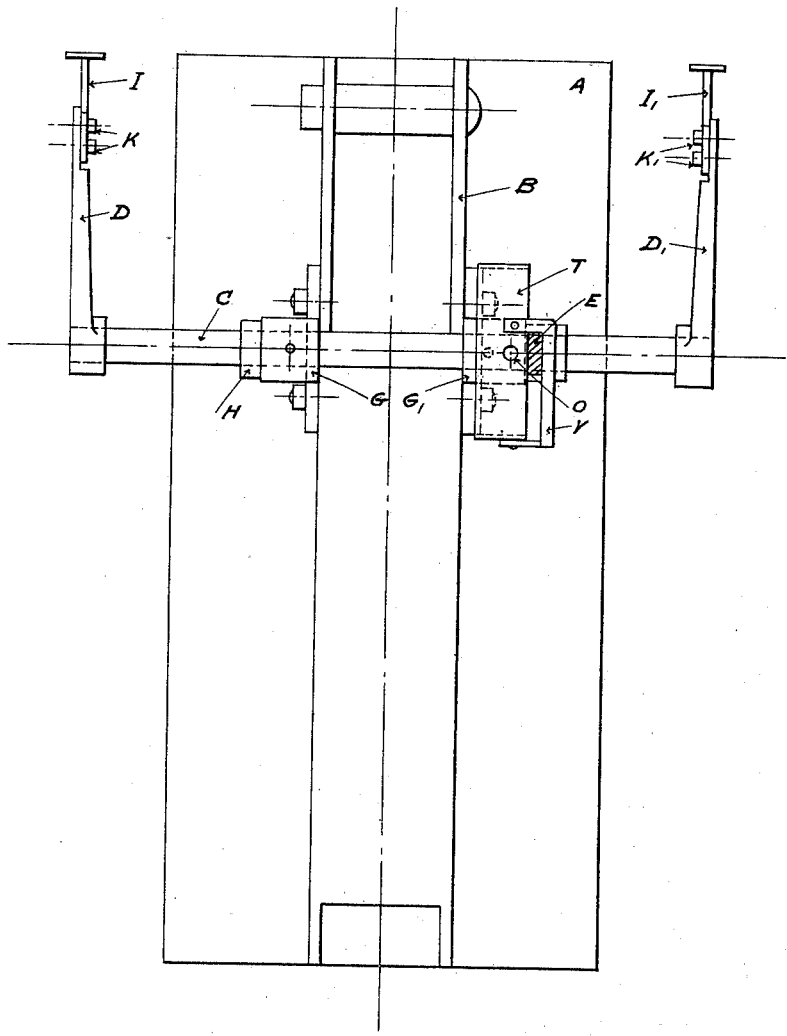

UNITED STATES PATENT OFFICE.

BENJAMIN BRINK, OF PEQUAMING, MICHIGAN, ASSIGNOR OF ONE-HALF TO CHARLES S. HEBARD, OF SAME PLACE.

WING FOR KNEES ON HEAD-BLOCKS FOR SAWMILLS.

SPECIFICATION forming part of Letters Patent No. 619,130, dated February 7, 1899.

Application filed August 20, 1895. Renewed February 20, 1897. Serial No. 624,488. (No model.)

*To all whom it may concern:*

Be it known that I, BENJAMIN BRINK, of Pequaming, Baraga county, and State of Michigan, have invented a new and Improved Device for Constructing a Wing to a Knee on a Head-Block of a Log-Carriage in a Sawmill, of which the following is a specification.

My invention has for its object the production of a mechanism that can be attached to a knee upon the head-block of a sawmill log-carriage, so as to brace the cant and prevent the two last boards cut from being of uneven thickness, thereby causing damage.

My device is for the purpose of accomplishing the result above set forth and is made so as to be efficient, constructed at small expense, and easily operated. I accomplish these objects by a combination of devices and appliances hereinafter described and claimed in the drawings and specification hereto attached.

In the drawings, Figure 1 is a side view of my invention. Fig. 2 is an end view of my invention. Fig. 3 is a top view of my invention.

A is a head-block on a sawmill-carriage.

B is a knee attached to the head-block.

C is a rolling shaft pillowed in boxes G and G'.

H is a collar fastened onto shaft C by set-screw and prevents shaft C from moving endwise.

D and D' are arms provided with hubs which slip onto the ends of shaft C and are fastened thereto by set-screws.

E is a lever provided with a hub which slips onto shaft C and is held firmly in position by set-screw. Said lever raises and lowers the arms D and D' by rolling shaft C when in use. Lever E is fastened onto shaft C close to box G' and prevents shaft C from moving endwise.

F is a handle attached to lever E and connected by rod M to bolt L.

N is a spiral spring adjusted around bolt L between lugs R and R' and by means of which bolt L when raised by handle F is sprung back into holes O in arc T and by that means keeping lever E in the desired position.

I and I' are extension-pieces to arms D and D' and are provided with slots, in which slots the said extensions I and I' are lengthened or shortened and held in position by bolts K and K', as desired.

G is a shaft-box bolted upon the side of B, in which shaft C rests.

G' is a shaft-box in which shaft C also rests, and to said box G' arc T is attached. Both of said shaft-boxes are bolted onto the sides of B. Arc T is provided with guide V, of circular form, corresponding to said arc, and lever E moves backward and forward in the opening between the guide V and arc T. Arc T is provided with two holes O to receive bolt L. Said lugs R and R' are a part of lever E and are attached to lever E for the purpose of holding bolt L and spiral spring N in position. Bolt L passes through said lugs as it works up and down and into holes O in arc T for the purpose of locking lever E and thus keeping arms D and D' in the position desired.

My device forms wings easily, quickly, and efficiently operated, and the purpose of my invention is to more efficiently support and brace the last two boards in a cant to prevent their springing, and thus make uniform thickness of lumber.

My device is so attached to the knee of the head-block that it constructs wings that operate by overhand motion down to and against the cant, and it can be quickly and efficiently adjusted for use without loss of time, and will accomplish the purpose desired, and is more efficient for accomplishing that purpose than any other device now in use within my knowledge.

I do not claim any patentable novelty upon the head-block or the knee, but only upon the device attached to the knee on the head-block for the purposes above stated and as shown and described.

I have described the wing as formed by rolling shaft C, made to revolve in boxes G and G' by means of lever E. This is a convenient and satisfactory manner for raising and lowering arms D and D', yet other devices for raising and lowering the arms may be employed. I therefore do not confine myself to this precise manner of adjustment, but claim wings thus constructed that are raised from a longitudinal position by means of the device above described or by hinges or any other device attached to carriage or knee for the purpose of raising or lowering same.

What I claim is—

The combination with the carriage and knee, with shaft C boxed in G and G', provided with arms D and D', having extensions I and I', with extension slots and bolts K and K'; lever E secured to shaft C and adjusted between arc T and V by handle F; rod M, bolt L, engaging holes O, and impelled by spring N between lugs R R', all substantially as shown and described.

Dated August 5, 1895.

BENJAMIN BRINK.

In presence of—
CHAS. S. HEBARD,
WM. K. HAVILAND.